(12) United States Patent
Ohbitsu (10) Patent No.: US 8,787,466 B2
(45) Date of Patent: Jul. 22, 2014

(54) VIDEO PLAYBACK DEVICE, COMPUTER READABLE MEDIUM AND VIDEO PLAYBACK METHOD

(75) Inventor: Toshiro Ohbitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/420,009

(22) Filed: Mar. 14, 2012

(65) Prior Publication Data
US 2012/0170918 A1   Jul. 5, 2012

Related U.S. Application Data (63) Continuation of application No. PCT/JP2009/066142, filed on Sep. 16, 2009.

(51) Int. Cl.
*H04N 7/12* (2006.01)
*H04N 11/02* (2006.01)
*H04N 11/04* (2006.01)
*H04N 7/50* (2006.01)
*H04N 7/26* (2006.01)

(52) U.S. Cl.
CPC ............. *H04N 7/50* (2013.01); *H04N 7/26941* (2013.01); *H04N 7/26244* (2013.01); *H04N 7/26265* (2013.01)
USPC .................................... 375/240.26

(58) Field of Classification Search
CPC . H04N 7/50; H04N 7/26941; H04N 7/26244; H04N 7/26265
USPC ........................ 375/240.12–240.26
See application file for complete search history.

(56) References Cited

U.S. PATENT DOCUMENTS

| | | | | |
|---|---|---|---|---|
| 6,912,253 B1 * | 6/2005 | Li et al. | ........... | 375/240.12 |
| 6,990,241 B2 * | 1/2006 | Natarajan et al. | ........... | 382/233 |
| 7,672,377 B2 * | 3/2010 | Heng et al. | ........... | 375/240.16 |
| 8,300,688 B2 * | 10/2012 | Lu et al. | ........... | 375/240.03 |

(Continued)

FOREIGN PATENT DOCUMENTS

| | | |
|---|---|---|
| JP | 4-22073 | 4/1992 |
| JP | 1992-22073 | 4/1992 |

(Continued)

OTHER PUBLICATIONS

International Search Report of PCT/JP2009/066142 mailed Dec. 28, 2009.

(Continued)

*Primary Examiner* — Gelek W Topgyal
(74) *Attorney, Agent, or Firm* — Staas & Halsey LLP (57) ABSTRACT

A video playback device includes a part to acquire a first video data at a first frame rate containing frame sequences each including a frame holding information about a background image and information about a moving object image, and second frames each holding information about position of the moving object image; and a generation part to generate, based on the first video data, a second video data to be played back at a second frame rate, the generation part includes a part to compute, with respect to each two contiguous frames in the first video content, position of a virtual moving object image situated in between two moving object images in the two contiguous frames; and a part to create, with respect to each position of the virtual moving object image, a frame image containing the background image and the motion object image placed in the computed position.

12 Claims, 11 Drawing Sheets

(56) References Cited

U.S. PATENT DOCUMENTS

| | | | |
|---|---|---|---|
| 2005/0138569 A1 | 6/2005 | Baxter et al. | |
| 2007/0286286 A1* | 12/2007 | Heng et al. | 375/240.16 |
| 2008/0084925 A1* | 4/2008 | Rozen et al. | 375/240.01 |
| 2008/0112483 A1* | 5/2008 | Lu et al. | 375/240.03 |
| 2009/0016623 A1 | 1/2009 | Higewake | |

FOREIGN PATENT DOCUMENTS

| | | |
|---|---|---|
| JP | 11-215510 | 8/1999 |
| JP | 1999-215510 | 8/1999 |
| JP | 3132452 | 2/2001 |
| JP | 2002-094947 | 3/2002 |
| JP | 2002-94947 | 3/2002 |
| JP | 2003-309834 | 10/2003 |
| JP | 2004-172690 | 6/2004 |
| JP | 2006-319784 | 11/2006 |
| JP | 2007-520741 | 7/2007 |
| JP | 2009-21963 | 1/2009 |
| JP | 2009-021963 | 1/2009 |

OTHER PUBLICATIONS

Translation of the International Preliminary Report on Patentability, mailed Apr. 19, 2012, in corresponding International Application No. PCT/JP2009/066142 (6 pp.).

Japanese Office Action mailed Mar. 26, 2013 in corresponding Japanese Patent Application No. 2011-531686.

\* cited by examiner

BI-DIRECTIONAL PREDICTION

FIG. 7B

FORWARD PREDICTION

VIDEO PLAYBACK DEVICE, COMPUTER READABLE MEDIUM AND VIDEO PLAYBACK METHOD

CROSS-REFERENCE TO RELATED APPLICATIONS

This is a continuation of Application PCT/JP2009/066142, filed on Sep. 16, 2009, the entire contents of which are herein wholly incorporated by reference.

FIELD

The present invention relates to a video playback device and a video playback method which reduce frame rate of acquired video data and display video based on video data whose frame rate is reduced, and to a computer readable media stored with a video playback program for making an arithmetic device operate as the video playback device.

BACKGROUND

In recent years, demand for low-priced personal computers (PCs) has increased, and therefore, in order to lower the price of PCs, low-priced, and therefore low-efficiency, components are used for building PCs. For example, most of the low-priced notebook type personal computers (hereafter, which are abbreviated as the notebook PCs) are equipped with a display device, which is a device having a liquid crystal display screen etc., whose response speed is merely 50 fps (frame per second) because a high-priced display device can not be used. When such notebook PC is used to play back a 60 fps HD (High Definition) video content on the Internet, since the display device cannot display images (pictures) at rate of more than 50 fps, the problem is encountered that 10 frames per second are dropped.

One way that the above problem can be overcome is by reducing the frame rate of videos so as to be able to be played back by low-performance display devices (refer to patent documents 1-4). Here, most of video content are stored in an MPEG format, especially an MPEG-2 format. Every 15 frames of video content in the MPEG-2 format constitute a group. This group is called GOP (Group of Pictures). Decoding of the MPEG-2 video is performed in units of the GOP, and therefore it is difficult to reduce the frame rate by removing some frames. Moreover, since low-priced notebook PC contains, in order to lower its price, a CPU (Central Processing Unit) with slow operation speed, for instance, 1.6 GHz, it is also difficult to reduce the frame rate by performing process that requires much processing power.

RELATED ART DOCUMENTS

Patent document 1: Japanese Patent Laid-Open Publication No. 2002-94947
Patent document 2: Japanese Patent Laid-Open Publication No. 2003-309834
Patent document 3: Japanese Patent Laid-Open Publication No. 2006-319784
Patent document 4: Japanese National Publication of International Patent Application No. 2007-520741

SUMMARY

According to an aspect of the invention, a video playback device includes a video acquisition part to acquire a first video data encoded at a first frame rate, the first video data containing multiple frame sequences each including a frame holding both of information about a background image and information about a moving object image, and second frames each holding information about position of the moving object image in itself but not holding information about the background image; a video data generation part to generate, based on the first video data acquired by the video acquisition part, a second video data to be played back at a second frame rate lower than the first frame rate; and a video display part to display video based on the second video data generated by the video data generation part. Further, the video data generation part of the video playback device includes a computing part to compute, with respect to each two contiguous frames in the first video content, position of a virtual moving object image that is situated in between two moving object images in the two contiguous frames; and an frame image creating part to create, with respect to each position of the virtual moving object image computed by the computing part, a frame image containing the background image and the motion object image placed in the computed position, the frame image being a component of the second video data.

According to another aspect of the invention, a computer readable medium stored with a video playback program for making a computer function as a device that includes a video acquisition part to acquire a first video data encoded at a first frame rate, the first video data including multiple frame sequences each containing a frame holding both of information about a background image and information about a moving object image, and second frames each holding information about position of the moving object image in itself but not holding information about the background image; a video data generation part to generate, based on the first video data acquired by the video acquisition part, a second video data to be played back at a second frame rate lower than the first frame rate; and a video display part to display video based on the second video data generated by the video data generation part, and the video data generation part includes a computing part to compute, with respect to each two contiguous frames in the first video content, position of a virtual moving object image that is situated in between two moving object images in the two contiguous frames; and an frame image creating part to create, with respect to each position of the virtual moving object image computed by the computing part, a frame image containing the background image and the motion object image placed in the computed position, the frame image being a component of the second video data.

According to still another aspect of the invention, a video playback method includes acquiring a first video data encoded at a first frame rate, the first video data including multiple frame sequences each containing a frame holding both of information about a background image and information about a moving object image, and second frames each holding information about position of the moving object image in itself but not holding information about the background image; generating, based on the first video data acquired by the acquiring, a second video data to be played back at a second frame rate lower than the first frame rate; and displaying video based on the second video data generated by the generating, and the generating includes computing, with respect to each two contiguous frames in the first video content, position of a virtual moving object image that is situated in between two moving object images in the two contiguous frames; and creating, with respect to each position of the virtual moving object image computed by the computing, a frame image containing the background image and the motion object image placed in the computed position, the frame image being a component of the second video data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is started;

FIG. 7 is a diagram illustrating a bi-directional prediction (FIG. 7A) and a forward prediction (FIG. 7B) which are representative examples of the predicting method in MPEG-2;

FIG. 11 is a diagram illustrating a conventional MPEG decoding operation process (FIG. 11A) and an MPEG decoding operation process after an interpolation operation process (FIG. 11B).

DESCRIPTION OF EMBODIMENT(S)

Embodiments of the present invention will hereinafter be described.

Figure 1:
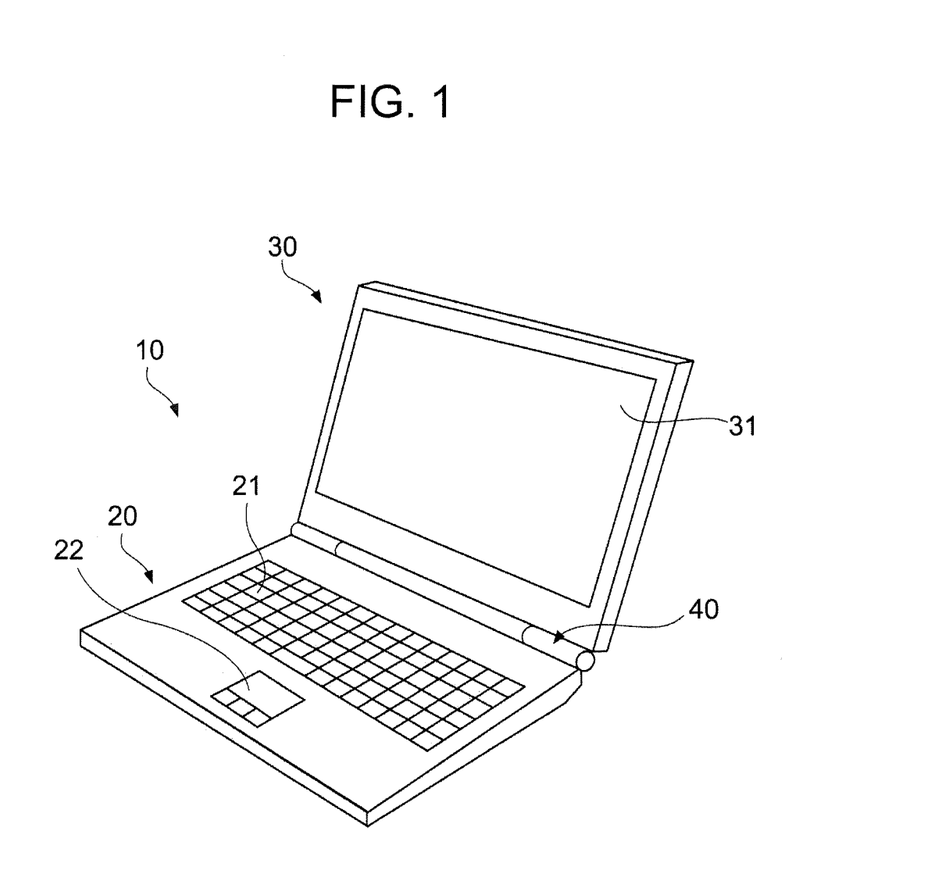
FIG. 1 is a perspective view illustrating an outside appearance of an example of a notebook PC as an embodiment of the present invention.

FIG. 1 is a perspective view illustrating an example of a notebook PC as an embodiment of the present invention.

The notebook PC 10 illustrated in FIG. 1 has a main part unit 20 and a display unit 30. The main part unit 20 includes a CPU, a hard disk drive (which will be hereafter abbreviated to the "HDD"), etc. therein, and further includes a keyboard 21, a touchpad 22 which is a kind of a pointing device, etc. arranged on its upper surface. The display unit 30 is so joined to the main part unit 10 by a hinge 40 as to be openable and closable with respect to the main part unit 10. The display unit 30 includes a display screen 31 arranged on the surface that turns to the front when the display unit 30 is in open state.

Figure 2:
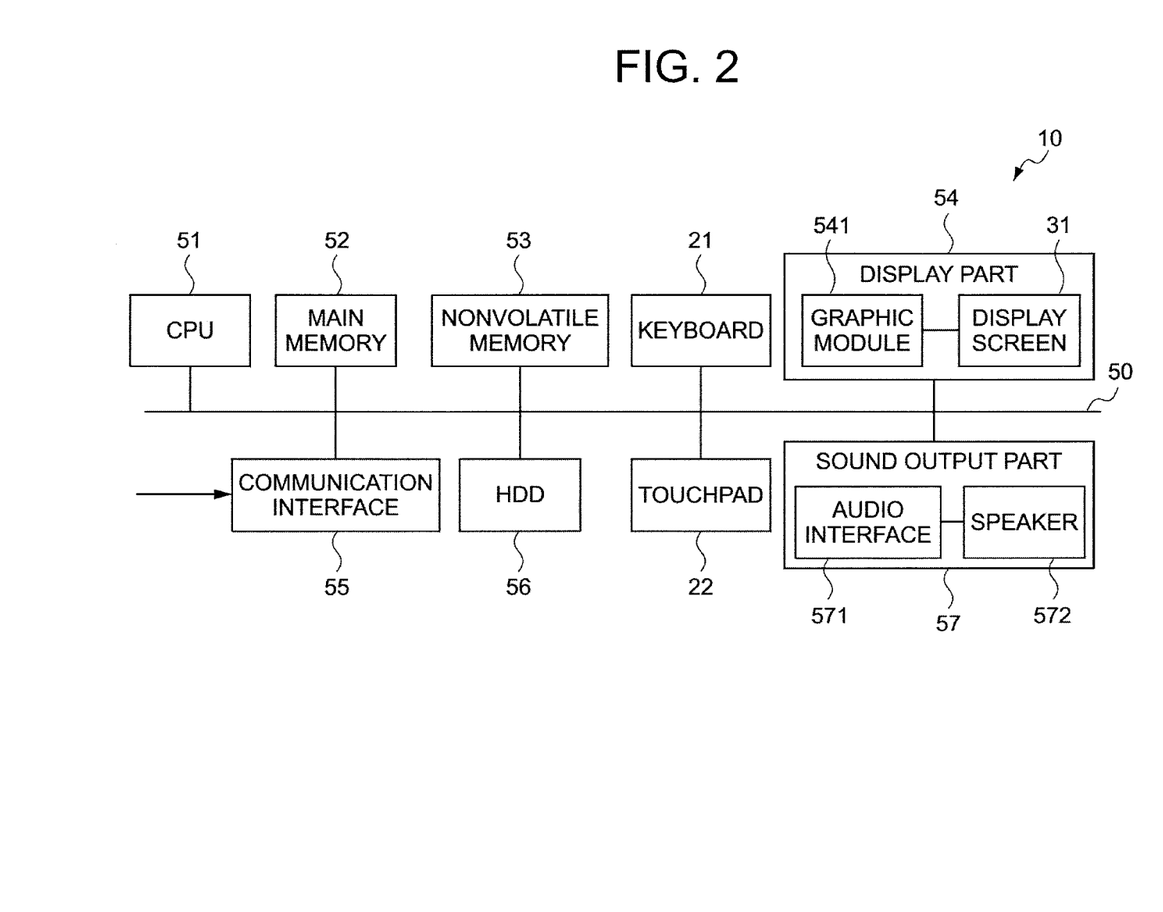
FIG. 2 is a block diagram illustrating an outline of a hardware configuration of the notebook PC, the outside appearance of which is illustrated in FIG. 1.

FIG. 2 is a block diagram illustrating a hardware configuration of the notebook PC whose outside appearance is illustrated in FIG. 1.

In this figure, illustrated are a CPU 51, a main memory 52, a nonvolatile memory 53, the keyboard 21 also illustrated in FIG. 1, and a display part 54 that includes a graphic module 541 and the display screen 31 of FIG. 1. Furthermore, a communication interface 55, an HDD 56, the touchpad 22 that is also illustrated in FIG. 1, a sound output part 57 that includes an audio interface 571 and a speaker 572 are illustrated. These components 21, 27, 51-57 are connected via a bus 50 with each other.

The communication interface 55 is connected to the Internet, and performs communication through the Internet. In particular, the communication interface 55 of the present embodiment receives video content following the MPEG-2. The HDD 56 is a mass storage device and is stored with various programs including a video playback program that serves as an embodiment of the present invention, multiple pieces of video content that have been input via the Internet, etc. The touchpad 22 is a kind of a pointing device that allows a user to move a cursor on the display screen 31 (refer to FIG. 1), which constitutes a part of the display part 54, and to click an icon or the like on the display screen 31. The sound output part 57 receives audio data, changes it into an analog audio signal by means of the audio interface 571, and outputs sound from the speaker 572.

The CPU 51 is a central processing unit that executes a program. A CPU whose operating speed is 1.6 GHz, which is comparatively slow operating speed, is employed in the notebook PC of the present embodiment. The main memory 52 is a memory into which programs are loaded from HDD 56 for being executed by the CPU 51. This main memory 52 is also used as a temporary storage of data while the programs are executed by the CPU 51. The nonvolatile memory 53 is stored with an BIOS (Basic Input Output System) that is a program executed immediately after power is applied to this notebook PC 10. The keyboard 21 is a tool that allows the user to enter variety pieces of information and directions.

The display part 54 is a part that receives data to be displayed, and displays pictures (images) corresponding to the data on the display screen 31 (refer to FIG. 1). In particular, the display part 54 receives video data, changes it into video signal by means of the graphic module 541, and displays video (motion pictures) on the display screen 31. This display part 54 has a capability of displaying video with up to 50 fps that is a relatively slow display speed. Moreover, the display screen 31 (refer to FIG. 1) which constitutes a part of the display part 54 is a 1024×574 pixel display screen.

In this embodiment, the communication interface 55 receives video content which is encoded in the MPEG-2 format and is transmitted via the Internet. When the communication interface 55 receives video content, the video content is temporarily stored in the HDD 56. Subsequently, if the video content is one that is designated to be displayed at the frame rate of 60 fps, the frame rate of the video content is reduced by the video playback program executed by the CPU 51, and the video content of the reduced frame rate is transmitted to the display part 54. Then, the graphic module 541 draws pictures based on the received video content, thereby the video is displayed on the display screen 31 (refer to FIG. 1).

Moreover, audio data in the video content is transmitted to the sound output part 57, and sound synchronized with the video displayed on the display screen 31 is output by the sound output part 57.

Figure 3:
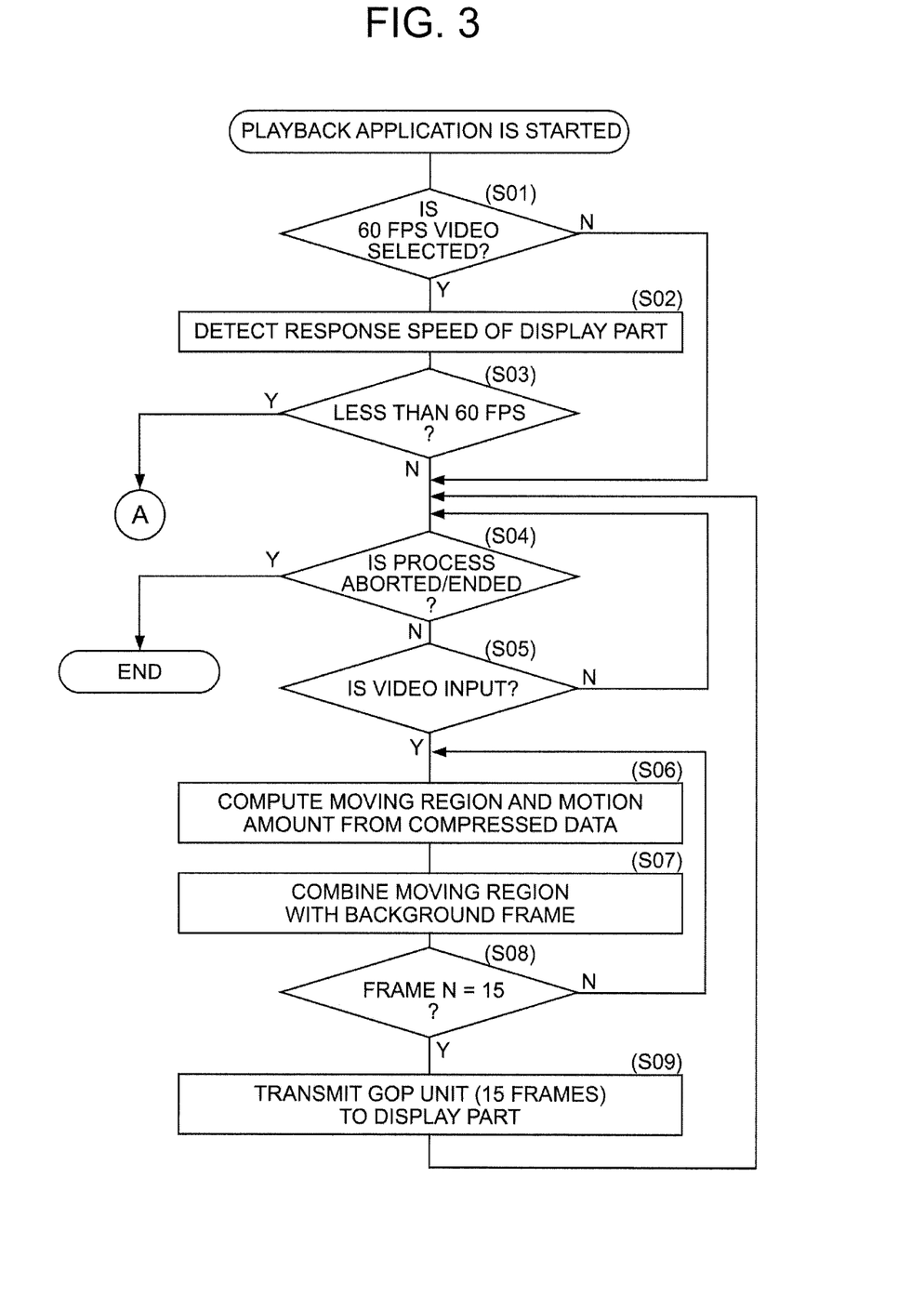
FIG. 3 is a part of a flowchart of a video playback program (playback application)
Figure 4:
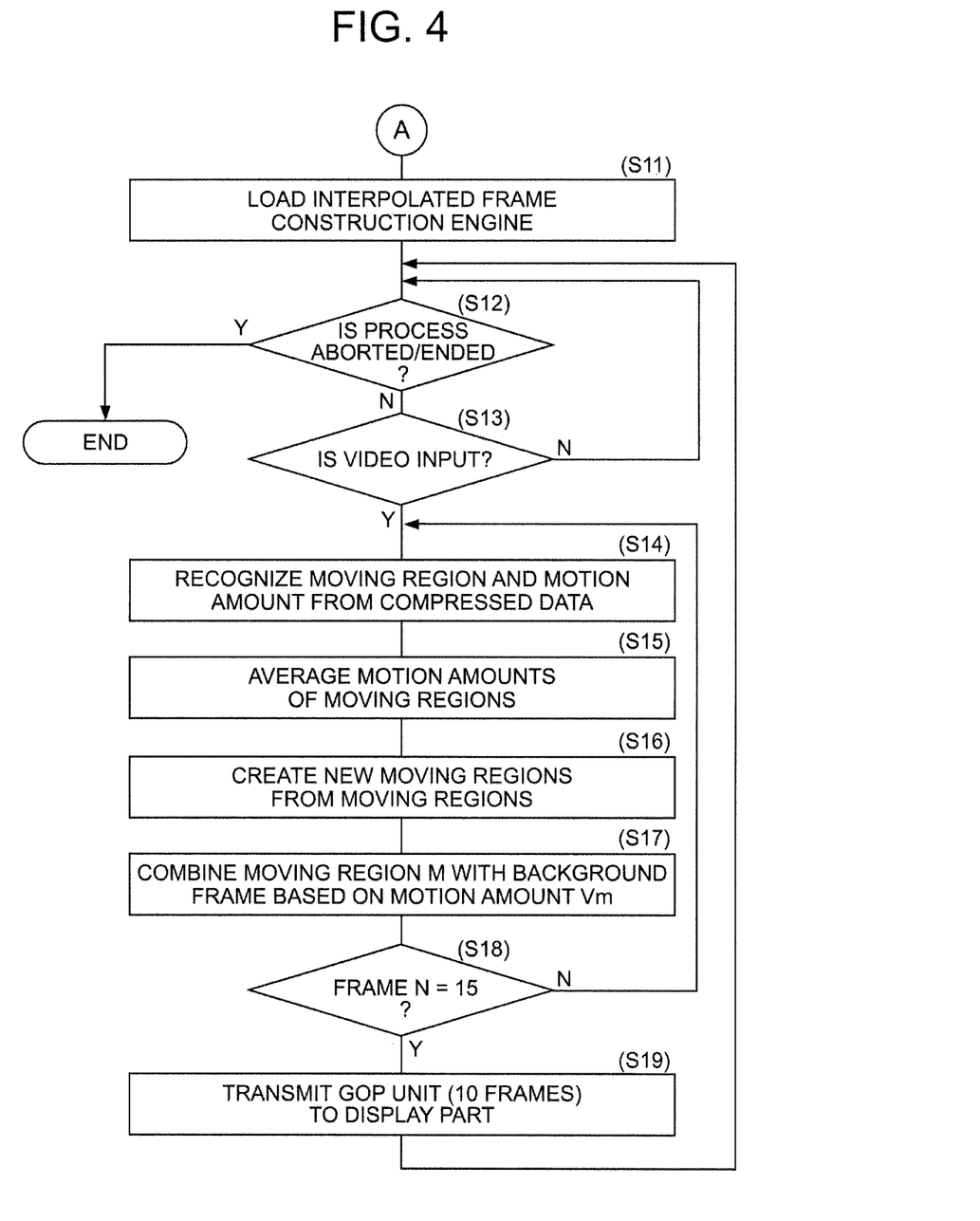
FIG. 4 is the remaining part of the flowchart of the video playback program (playback application)

FIG. 3 and FIG. 4 are a flowchart of a program for video playback (hereinafter, referred to "the playback application").

Figure 5:
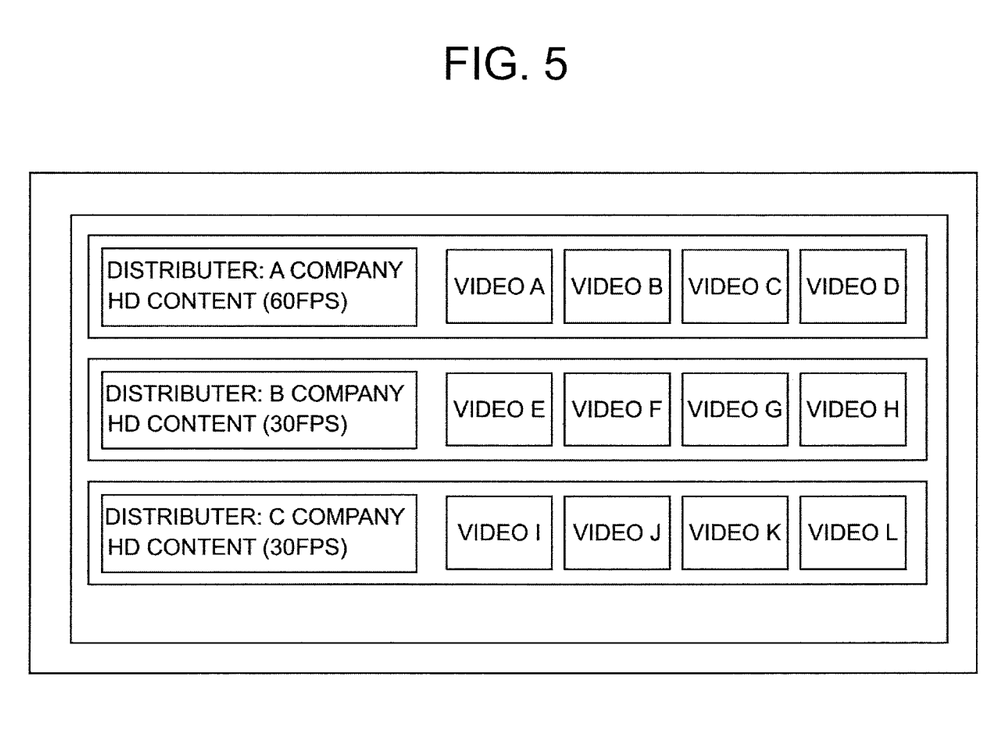
FIG. 5 is a diagram illustrating an example of a menu screen displayed on a display screen at the time when the playback application illustrated in FIG. 3
Figure 6:
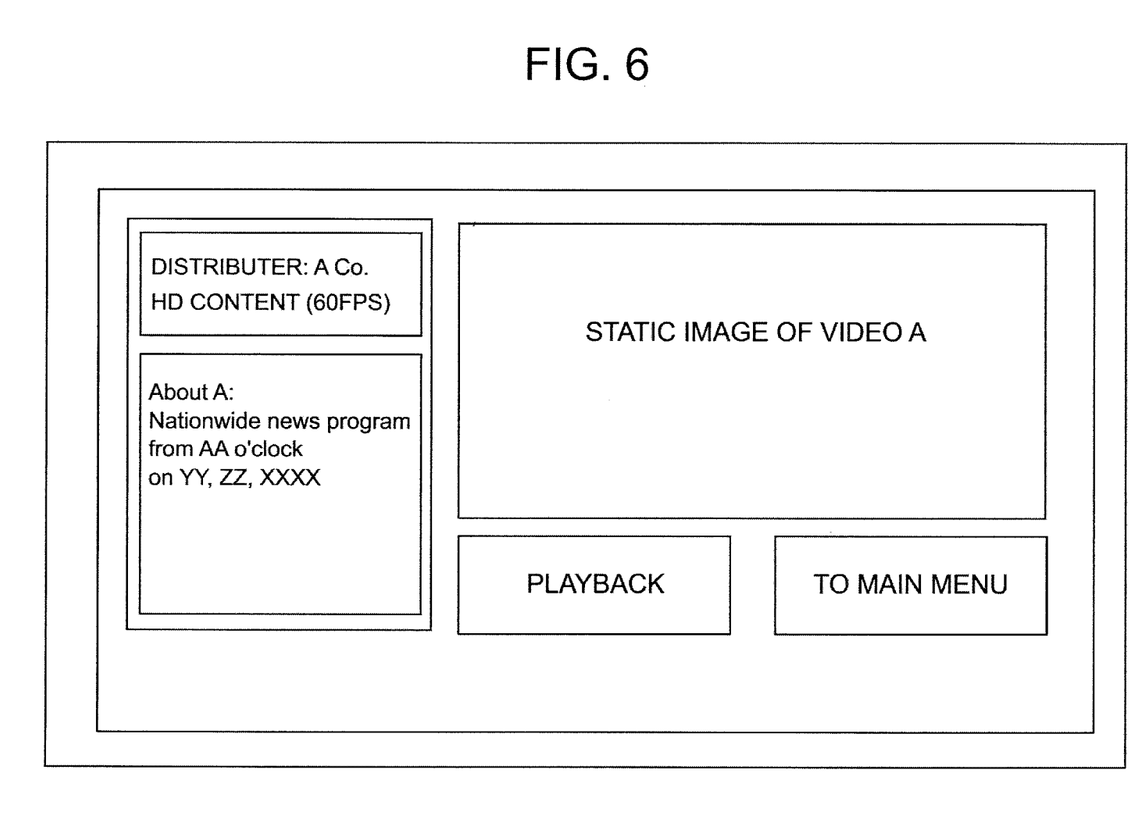
FIG. 6 is a diagram illustrating an example of a screen displayed when "video A" on the menu screen illustrated in FIG. 5 is selected.

FIG. 5 is a diagram illustrating an example of a menu screen displayed on the display screen 31 (refer to FIG. 1) at the time when the playback application illustrated in FIG. 3 and FIG. 4 is started, and FIG. 6 is a diagram illustrating an example of a screen displayed when "video A" on the menu screen illustrated in FIG. 5 is selected.

When the playback application illustrated in FIG. 3 and FIG. 4 is started, a menu screen, for instance, the menu screen illustrated in FIG. 5, which summarizes multiple pieces of video content which have been downloaded from the Internet and stored in the HDD 56. When "video A" on this menu screen is selected, a screen illustrated in FIG. 6 is displayed. When "playback" on the screen illustrated in FIG. 6 is selected, playback of the video A is started. On the other hand, when "to main menu" on the screen illustrated in FIG. 6 is selected, the menu screen illustrated in FIG. 5 is re-displayed.

The following is a description of the flowchart of the playback application illustrated in FIG. 3 and FIG. 4.

When the playback application is started, at first, it is judged whether playback of a 60 fps video is selected by the user (step S01). Selection of a video to be played back is performed in a manner already explained with reference to FIG. 4 and FIG. 5. If playback of a 60 fps video is selected, the response speed of the display part in the notebook PC that performs this video playback process (the notebook PC 10 illustrated in FIG. 1 and FIG. 2 in this embodiment) is detected from device information, such as BIOS information, etc, stored in the nonvolatile memory 53 (refer to FIG. 2) (step S02). If the video that has just selected to be played back is a 60 fps video and the response speed of the display part is less than 60 fps, since some frames will inevitably be dropped as it is, the process advances to the flowchart illustrated in FIG. 4 (step S03), and changing of the frame rate is performed. However, first of all, a description will be given of the processing performed when the video that has just selected to be played back is a video with less than 60 fps or the response speed of the display part is more than 60 fps, that is, when there is no need to change the frame rate.

When video with less than 60 fps is selected at step S01 or when a 60 fps video is selected and then it is judged that the response speed of the display part is equal to or greater than 60 fps, the process advances to step S04. At step S04, it is judged whether the video playback process is aborted or ended. The abort/end of the process occurs, for example, at the time when the playback of the video is completed or the abort is indicated by the user. When the abort/end of the process occurs, the playback application is terminated. If the abort/end of the process does not occur, one GOP unit of the video content is read from the HDD 56 and input into the main memory 52 (step S05), and then an MPEG-2 decoding process is performed (steps S06-S08).

Here, a brief description is given of an outline of an MPEG-2 frame format. Video content which follows the MPEG-2 format includes three types of frames: I-frames (Intra-coded frames), P-frames (Predicted frame) and B-frames (Bi-directional predicted frames), and every 15 frames in the video content is grouped into a GOP (Group of Pictures), each given as I1-B2-B3-P4-B5-B6-P7-B8-B9-P10-B11-B12-P13-B14-B15. The ratio between average data amounts for I-frame, P-frame and B-frame is approximately I:P:B=4:2:1. The I-frames are frames encoded without using an inter-frame prediction, the P-frames are frames encoded using only a forward prediction, and the B-frames are frames encoded using one prediction selected from the forward prediction, a backward prediction and a bi-directional prediction. The MPEG-2 employs the inter-frame prediction. The inter-frame prediction is a technique of predicting a current frame from its preceding frame by exploiting the fact that video (motion pictures) has a tendency for each frame to resemble its preceding frame. Since only the difference between input picture and predicted picture is encoded, the inter-frame prediction can achieve a high compression ratio. The MPEG-2 also employs a technique that is called a motion compensation in order to further improve the compression efficiency. The motion compensation is a technique that is employed in the inter-frame prediction for compensating for motion of an object in the current frame and its preceding frame. By the motion compensated inter-frame prediction, the current frame is predicted by specifying an image in the preceding frame which is similar to an image to be coded, and shifting the specified image to the position of the image to be coded. Further, by the motion compensated inter-frame prediction, frame data that contains a motion vector that represents a motion amount between the images, and difference data between the image predicted by the motion vector and the image to be coded is generated.

Figure 7A:
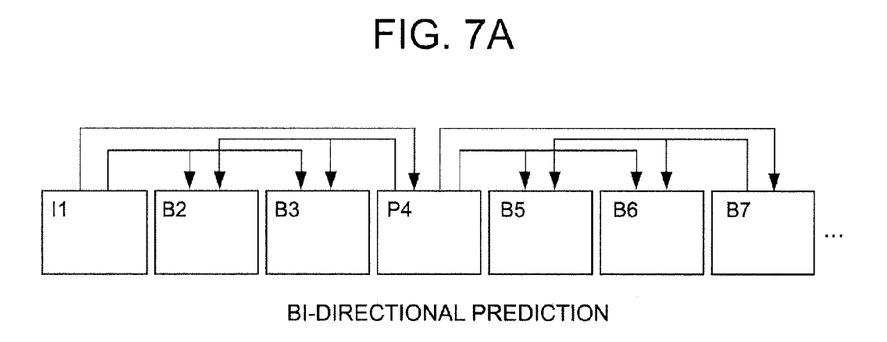
Figure 7B:
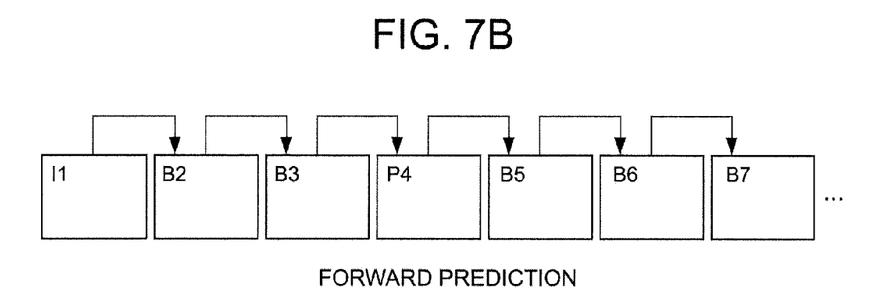

FIG. 7 is a diagram illustrating the bi-directional prediction (FIG. 7A) and the forward prediction (FIG. 7B) which are representative examples of the prediction method in MPEG-2.

By the bi-directional prediction illustrated in FIG. 7A, the P-frame is predicted from the preceding I-frame or P-frame, and the B-frame is predicted from both of the following P-frame and the preceding I-frame or the P-frame.

By the forward prediction illustrated in FIG. 7B, the B-frames are also predicted from the preceding frame.

The frame format of MPEG-2 is well known, and therefore further explanations will be omitted.

Figure 8:
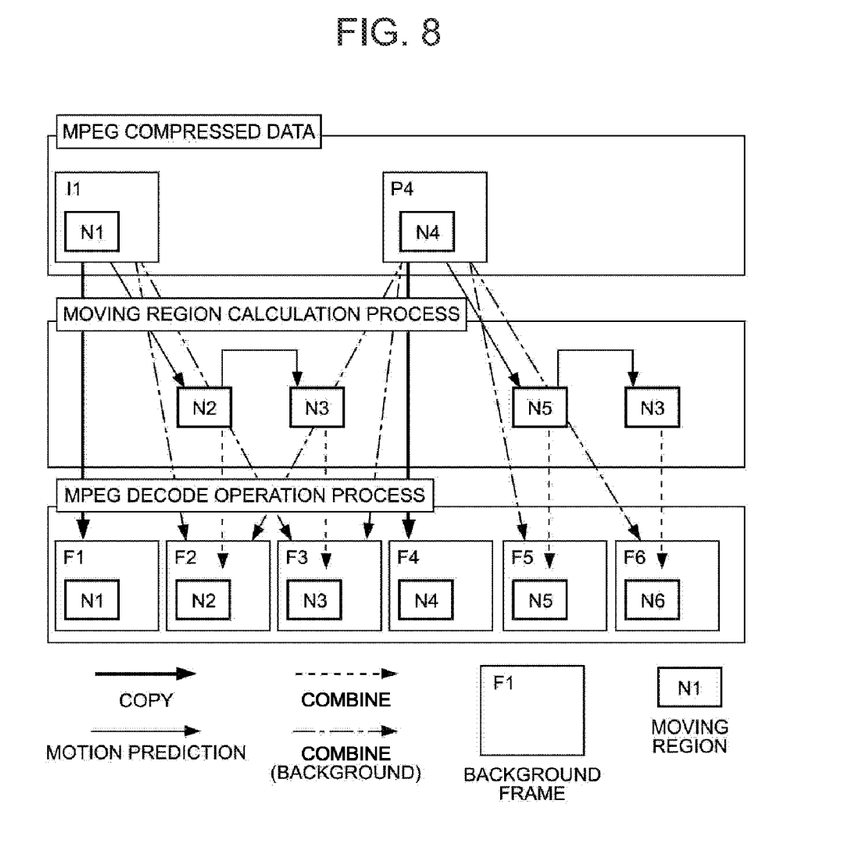
FIG. 8 is a diagram illustrating an outline of MPEG-2 decoding process.

FIG. 8 is a diagram illustrating an outline of a MPEG-2 decoding process. Since the MPEG-2 decoding process is a well known art, a description will be given of only points required for understanding the feature of after-mentioned decoding process that includes a process of reducing the frame rate (refer to FIG. 9) referring to FIG. 8 and the flowchart in FIG. 3. Note that, the following explanation is based on the assumption that the prediction method is the bi-directional prediction. However, only the arrows based on the forward prediction are depicted in FIG. 8 in order to avoid the figure from becoming complicated.

The I1-frame is decoded only from the I1-frame, thereby generating the F1-frame. This F1 frame is a frame that consists of a background and the moving region N1 in the I1-frame.

The P4-frame is decoded from the P4-frame and the I1-frame, thereby generating the F4-frame. This F4-frame is a frame that consists of the background and the moving region in the P4-frame.

The B1-frame following the I1-frame, and the B2-frame following the B1-frame are frames obtained by encoding only the moving region N1, and the moving region N2, respectively. From data of the B1-frame and B2-frame, image data of the moving regions N2 and N3, and motion amounts of the moving regions N2 and N3 are calculated (step S06), and then the F2-frame and F3-frame are generated by combining the moving regions N2 and N3 with the background frame generated from the I1 frame (step S07). The F5-frame following the F4 frame, the F6-frame, . . . are generated in the same way.

When generation of one GOP consisting of 15 frames is completed (step S08), the GOP (15 frames) is transmitted to the display part (step S09). The display part displays, based on the video data that has been transmitted, video on the display screen 31 (refer to FIG. 1).

Figure 9:
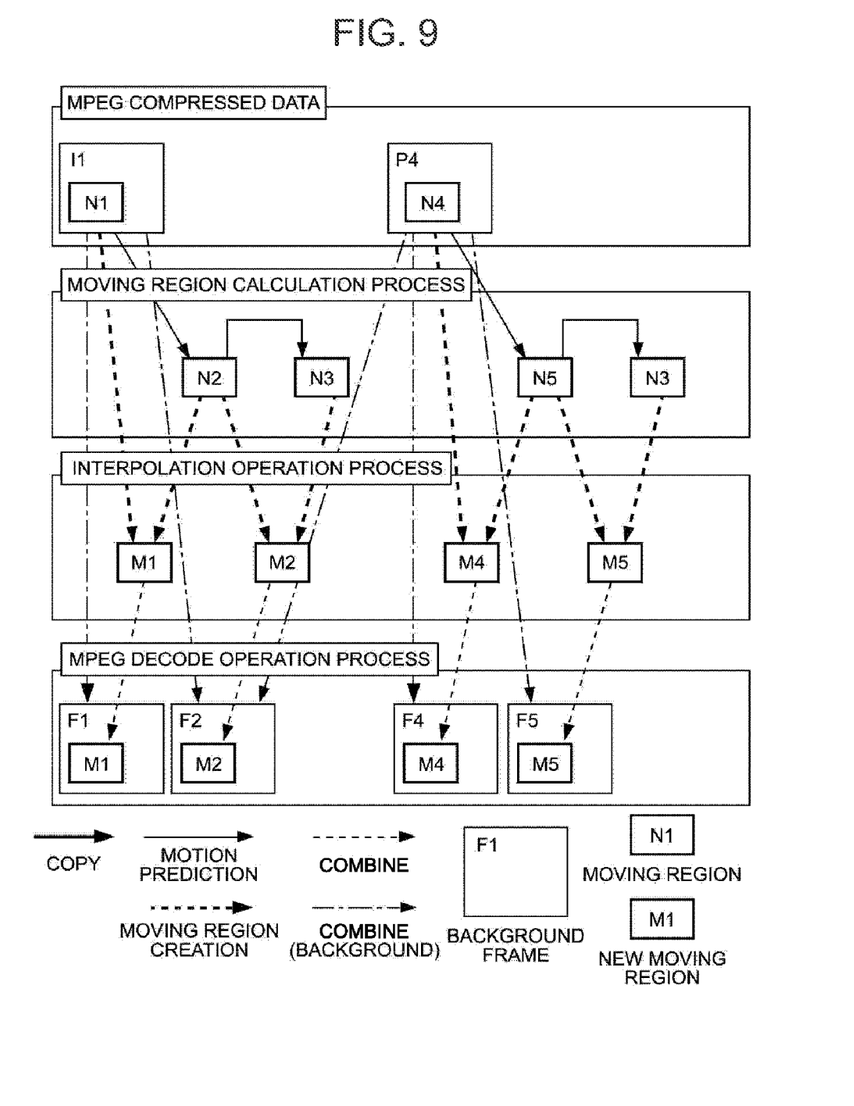
FIG. 9 is a diagram illustrating an outline of a decoding process in an embodiment.

FIG. 9 is a diagram illustrating an outline of the decoding process in an embodiment of the present invention.

When a video to be played back with 60 fps is selected at step S01 in FIG. 3 and the response speed of the display part is judged to be less than 60 fps at step S03, the process advances to step S11 in FIG. 4. At this step, in order to lower the frame rate of the video content, an interpolation frame construction engine that is a program component in the playback application is loaded from the HDD 56 into the main memory 52. Steps S12-S14 following step S11 are identical with steps S03-S06 of FIG. 3, respectively, and therefore the description of these steps will be omitted.

At step S15, from the motion amounts of the moving regions, motion amounts Vm are calculated by the interpolation frame construction engine loaded at step S11, and, at step S16, new moving regions M are created from the moving regions. Specifically, a half of a motion amount Vn2 that is a motion amount of moving region N1 in the I1-frame to the moving region N2 in the B2-frame, and a half of a motion amount Vn3 that is a motion amount of the moving region N2 in the B2-frame to the moving region N3 in the B3-frame are calculated as a motion amount $V_{m1}$ and a motion amount $V_{m2}$, respectively. Furthermore, a new moving region M1 positioned at a middle position (the position whose motion amount from the moving region N1 is $V_{m1}$) between the moving region N1 in the I1-frame and the moving region N2 in the B2-frame, and a new moving region M2 positioned at a middle position (the position whose motion amount from the moving region N1 is $V_{m2}$) between the moving region N1 in the I1-frame and the moving region N2 in the B2-frame are created.

Figure 10:
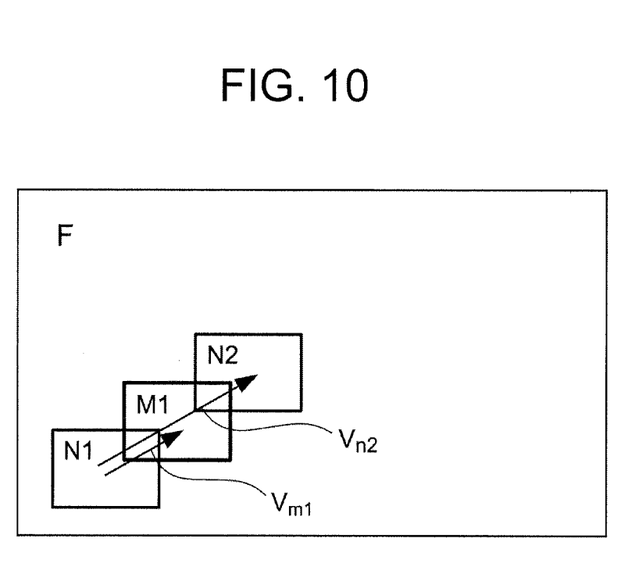
FIG. 10 is a diagram illustrating moving regions and motion amounts.

FIG. 10 is a diagram illustrating the moving regions and the motion amounts.

In this FIG. 10, illustrated is the state where the moving region N1 of the I1-frame and the moving region N2 of the B2-frame are arranged virtually on the background frame F. The new moving region M1 is created so that its motion amount $V_{m1}$ matches with a half of the motion amount $V_{n2}$ that is a motion amount of the moving region N1 to the moving region N2. For example, if the coordinates of the moving region N1 are (00, 00) and the coordinates of the moving region N2 are (10, 10), the motion amount $V_{n2}$, which is the motion amount of the moving region N1 to the moving region N2, becomes (10, 10), and therefore the motion amount $V_{m1}$ of the new moving region M1 become (05, 05). Moreover, in cases where the two moving regions N1 and N2 have different sizes with each other, the new moving region M1 has intermediate size between those of the two moving regions N1 and N2. For example, if an area of the moving region N1 is 10 and an area of the moving region N2 is 30, the new moving region M1 having an area of 20 is created. Note that, in FIG. 9, each of the moving regions N1 and N2, and the new moving region M1 is illustrated as a rectangle region, however, each region can be a region in any shape since each region is not need to be a rectangle region.

Referring back to FIG. 9, the discussion will continuously proceed.

As illustrated in FIG. 9, when the new moving regions M1 and M2 have been created, image of the whole region of each interpolated frames F1 and F2 is generated by the MPEG decoding operation process by combining the moving region N2 or N3 with the background frame generated from the I1 frame or the P4 frame. Thereafter, creation of the new moving regions M4, M5, . . . , and generation of the interpolated frames F4, . . . are performed in the same way.

When processing with respect to 15 frames is completed, and thereby 10 interpolated frames are created (step S18 in FIG. 4), the 10 interpolated frames created from one GOP are transmitted to the display part 54 (refer to FIG. 2) (step S19 in FIG. 4). The transmitted interpolated frames are processed by the graphic module 541 in the display part 54, and thereby motion pictures are displayed on the display screen 31.

As described above, by the present embodiment, the interpolated frame is created by computing the new moving region, which is considerably smaller than the whole region of the frame, and combining the new moving region with the background. Consequently, by the present embodiment, it is possible to create the interpolated frame at a much lower computational complexity than the case where the interpolated frame is created by creating image of the whole region of the frame.

The following is an explanation about that video can be displayed at 60 fps by the method of the present embodiment.

Figures 11A, 11B:
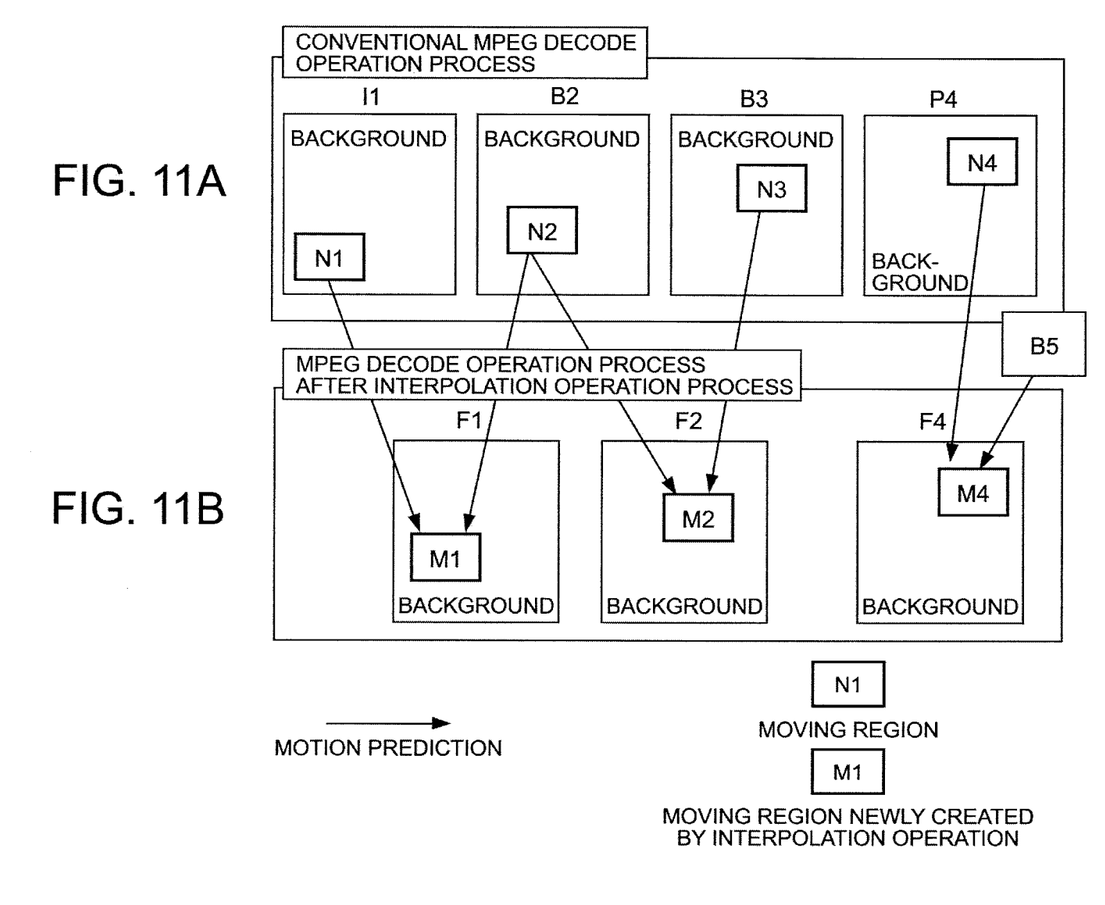

FIG. 11 is a diagram illustrating the conventional MPEG decoding operation process (FIG. 11A) and the MPEG decoding operation process after the interpolation operation process (FIG. 11B). The procedure of constructing the interpolated frames from the new moving regions and the background are already explained. Therefore, the following discussion will be focused on averaging the moving regions.

Note that the following discussion assumes that the operation speed of CPU is 1.6 GHz, and screen size, color depth, and the maximum frame rate of the display screen 31 is 1024×574, 24-bit color, and 50 fps, respectively.

As already mentioned, the sequence of frames in the MPEG data is: I1→B2→B3→P4→B5→B6→→ . . . →B14→B15→I16→ . . . and so on. The new moving region M1 newly created by the interpolation operation is an average of the moving region N1 in the I1-frame and the moving region N2 that the B2-frame represents. Namely, $V_{n2}$ that is the motion amount (displacement) between the moving region N1 and moving region N2 and Vm1 that equals to a half of $V_{n2}$ are calculated, and then a region whose motion amount (displacement) from the moving region N1 equals to Vm1 is determined to be the new moving region M1. Here, background image data created by the conventional MPEG decoding can be used directly as background image data with which the new moving region M1 combined. That is, the present method is the one that does not require any new process for creating background image data. By the conventional MPEG decoding process, decoding of one frame can be completed within 5.6 msec. This value is the average of the processing times required by the conventional MPEG decoding process to decode frames with different types and contents. By the method of the present embodiment, in addition to the conventional MPEG decoding process, the process of creating the new moving regions M1, M2, . . . is performed. However, creation of one new moving region can be performed within a time shorter than 5.6 msec, since the new moving regions M1, M2, . . . are created from the moving region N1 and the motion amount $V_{n2}$, the moving region N2 and the motion amount Vn3, . . . , respectively. Concretely, the time required to create the new moving regions is as follows.

The information amount of the B-frame is ¼ of the information amount of the I-frame and the information amount of the P-frame is ½ of the information amount of the I-frame. Therefore, the time required to process 60 frames by "the interpolation operation process" of FIG. 9 is (the number of I-frames+¼ of the number of B-frames+½ of the number of P-frame)×5.6 msec=(1+10/4+4/2)×4×5.6=123.2 msec. It should be note that this 123.2 msec is the time required to complete "the interpolation operation process" for 60 frames, and the time required to complete "the moving region calculation process" and "the MPEG decoding operation process" for one frame is contained in 5.6 msec. Consequently, operation time required to generate 60 frame images is 5.6×60+123.2=459.2 msec. This value is quite less than one second. Thus, it is possible to display video normally by the process that includes the above-mentioned interpolation operation process.

Note that, since the number of the interpolated frames created by the method of the present embodiment in one second is not 60 but 40, actual operation time becomes shorter than the above estimated time.

Moreover, there are cases where each frame of a 30 fps video data is repeated twice every 60th of a second, and thereby attaining a display at 60 fps. The operation time becomes shorter than the above estimated time also in these cases.

Thus, according to the present embodiment, it is possible to display video data at reduced frame in a way that dose not require much operation time, or much computational complexity.

Note that the above-mentioned device is the one that reduces the frame rate of the MPEG-2 video data to two-thirds by creating, with respect to every three frames, two frames from the three frames, however, the present technique can be also used for reducing the frame rate to any value other than two-thirds. Moreover, the format of the video data may also be an MPEG format other than MPEG-2 format. Further, the video data may also be video data that is decoded using the motion compensated inter-frame prediction, but dose not follows any MPEG format.

In short, the present technique can be applied to any video as long as it contains multiple frame sequences each including a frame holding both of information about a background image and information about a moving object image, and second frames each holding information about position of the moving object image in itself but not holding information about the background image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments) of the present invention has (have) been described in detail, it should be understood that the various changes, substitutions, and alterations could be made hereto without departing from the spirit and scope of the invention.

What is claimed is:

1. A video playback device comprising:
    a video acquisition part to acquire a first video data encoded at a first frame rate, the first video data containing multiple frame sequences each including a frame holding both of information about a background image and information about a moving object image, and second frames each holding information about position of the moving object image in itself but not holding information about the background image;
    a video data generation part to generate, based on the first video data acquired by the video acquisition part, a second video data to be played back at a second frame rate lower than the first frame rate; and
    a video display part to display video based on the second video data generated by the video data generation part, wherein the video data generation part includes:
    a computing part to compute, with respect to each of three contiguous frames in the first video content, a position of a virtual moving object image that is situated in between a first and a second moving object images in each of two contiguous frames in the three contiguous frames as a half of a motion of the first moving object image and a half of a motion of the second moving object image; and
    a frame image creating part to create, with respect to each position of the virtual moving object image computed by the computing part, a frame image containing the background image and the moving object image placed in the computed position, the frame image being a component of the second video data.

2. The video playback device according to claim 1, wherein the first video data is data that is encoded by utilizing motion compensated inter-frame prediction.

3. The video playback device according to claim 1, wherein the first video data is an MPEG data, and each frame sequence in the first video data contains an I-frame and one or more P-frames each holding information about a background image and information about a moving object, and multiple frames each holding information about the moving object but not holding information about the background image.

4. The video playback device according to claim 1, wherein the computing part computes, with respect to each of three contiguous frames in the first video content, a position of the virtual moving object image in each of the two contiguous frames in the three contiguous frames from displacement between the two moving object images in each of the two contiguous frames in the three contiguous frames and position of one of the two moving object images in each of the two contiguous frames in the three contiguous frames.

5. A non-transitory computer readable medium stored with a video playback program for making a computer function as a device comprising:
    a video acquisition part to acquire a first video data encoded at a first frame rate, the first video data including multiple frame sequences each containing a frame holding both of information about a background image and information about a moving object image, and second frames each holding information about a position of the moving object image in itself but not holding information about the background image;
    a video data generation part to generate, based on the first video data acquired by the video acquisition part, a second video data to be played back at a second frame rate lower than the first frame rate; and
    a video display part to display video based on the second video data generated by the video data generation part, wherein the video data generation part includes:
    a computing part to compute, with respect to each of three contiguous frames in the first video content, a position of a virtual moving object image that is situated in between a first and a second moving object images in each of two contiguous frames in the three contiguous frames as a half of a motion of the first moving object image and a half of a motion of the second moving object image; and
    a frame image creating part to create, with respect to each position of the virtual moving object image computed by the computing part, a frame image containing the background image and the moving object image placed in the computed position, the frame image being a component of the second video data.

6. The non-transitory computer readable medium according to claim 5, wherein the first video data is data that is encoded by utilizing motion compensated inter-frame prediction.

7. The non-transitory computer readable medium according to claim 5, wherein the first video data is an MPEG data, and each frame sequence in the first video data contains an I-frame and one or more P-frames each holding information about a background image and information about a moving object, and multiple frames each holding information about the moving object but not holding information about the background image.

8. The non-transitory computer readable medium according to claim 5, wherein the computing part computes, with respect to each of the three contiguous frames in the first video content, a position of the virtual moving object image in each of the two contiguous frames in the three contiguous frames from displacement between the two moving object images in each of the two contiguous frames in the three contiguous frames and a position of one the two moving object images in each of the two contiguous frames in the three contiguous frames.

9. A video playback method comprising:
acquiring a first video data encoded at a first frame rate, the first video data including multiple frame sequences each containing a frame holding both of information about a background image and information about a moving object image, and second frames each holding information about position of the moving object image in itself but not holding information about the background image;
generating, based on the first video data acquired by the acquiring, a second video data to be played back at a second frame rate lower than the first frame rate; and
displaying video based on the second video data generated by the generating,
wherein the generating includes:
computing, with respect to each of three contiguous frames in the first video content, a position of a virtual moving object image that is situated in between a first and a second moving object images in each of two contiguous frames in the three contiguous frames as a half of a motion of the first moving object image and a half of a motion of the second moving object image; and
creating, with respect to each position of the virtual moving object image computed by the computing, a frame image containing the background image and the moving object image placed in the computed position, the frame image being a component of the second video data.

10. The video playback method according to claim 9, wherein the first video data is data that is encoded by utilizing motion compensated inter-frame prediction.

11. The video playback method according to claim 9, wherein the first video data is an MPEG data, and each frame sequence in the first video data contains an I-frame and one or more P-frames each holding information about a background image and information about a moving object, and multiple frames each holding information about the moving object but not holding information about the background image.

12. The video playback method according to claim 9, wherein the computing computes, with respect to each of the three contiguous frames in the first video content, a position of the virtual moving object image in each of the two contiguous frames in the three contiguous frames from displacement between the two moving object images in each of the two contiguous frames in the three contiguous frames and a position of one the two moving object images in each of the two contiguous frames in the three contiguous frames.

* * * * *

UNITED STATES PATENT AND TRADEMARK OFFICE
CERTIFICATE OF CORRECTION

| | |
|---|---|
| PATENT NO. | : 8,787,466 B2 |
| APPLICATION NO. | : 13/420009 |
| DATED | : July 22, 2014 |
| INVENTOR(S) | : Toshiro Ohbitsu |

It is certified that error appears in the above-identified patent and that said Letters Patent is hereby corrected as shown below:

In the Claims

Column 11, Line 6, In Claim 8, after "a position of one" insert -- of --.

Column 12, Line 25, In Claim 12, after "a position of one" insert -- of --.

Signed and Sealed this
Fourth Day of November, 2014

Michelle K. Lee
*Deputy Director of the United States Patent and Trademark Office*